United States Patent [19]

Benham et al.

[11] Patent Number: 5,071,927

[45] Date of Patent: Dec. 10, 1991

[54] HIGH-TEMPERATURE SLURRY POLYMERIZATION OF ETHYLENE

[75] Inventors: Elizabeth A. Benham; Max P. McDaniel, both of Bartlesville, Okla.; Robert R. McElvain; Roy O. Schneider, both of Houston, Tex.

[73] Assignee: Phillips Petroleum Company, Bartlesville, Okla.

[21] Appl. No.: 594,259

[22] Filed: Oct. 9, 1990

[51] Int. Cl.$^5$ .............................. C08F 2/14; C08F 4/24
[52] U.S. Cl. ..................................... 526/64; 526/106; 526/75; 526/348.5
[58] Field of Search ................................. 526/106, 64

[56] References Cited

U.S. PATENT DOCUMENTS

| | | | |
|---|---|---|---|
| 3,248,179 | 4/1966 | Norwood | 23/285 |
| 3,887,494 | 6/1975 | Dietz | 252/452 |
| 3,900,457 | 8/1975 | Witt | 260/94.9 D |
| 4,053,436 | 10/1977 | Hogan et al. | 252/452 |
| 4,151,122 | 4/1979 | McDaniel et al. | 252/458 |
| 4,294,724 | 10/1981 | McDaniel | 252/452 |
| 4,392,990 | 7/1983 | Witt | 252/458 |
| 4,405,501 | 9/1983 | Witt | 252/452 |
| 4,816,432 | 3/1989 | Hsieh | 502/107 |
| 4,818,800 | 4/1989 | McDaniel | 526/106 |
| 4,820,785 | 4/1989 | McDaniel | 526/105 |
| 4,988,657 | 1/1991 | Martin | 502/158 |

OTHER PUBLICATIONS

*Modern Plastics Encyclopedia*, Oct. 1990, p. 54: "High Density Polyethylene".
J. P. Hogan et al. (1981), J. Appl. Polymer Sci: *Applied Polymer Symposium* 36, 49–60: "Phillips Petroleum Company Loop Reactor Polyethylene Technology".

*Primary Examiner*—Joseph L. Schofer
*Assistant Examiner*—M. Nagumo
*Attorney, Agent, or Firm*—Carl D. Corvin

[57] ABSTRACT

This invention relates to a high-temperature slurry polymerization of ethylene where: the hexene is generated in situ; a chromium catalyst system is used; a trialkyl boron or a polyalkyl silane compound is used as a cocatalyst; the temperature of the reaction is above the foul curve temperature for a specific copolymer density; and where the polymerization takes place in a continuous loop reactor which has isobutane as a diluent. Additionally, hexene can be withdrawn, or added, to adjust the density.

15 Claims, 1 Drawing Sheet

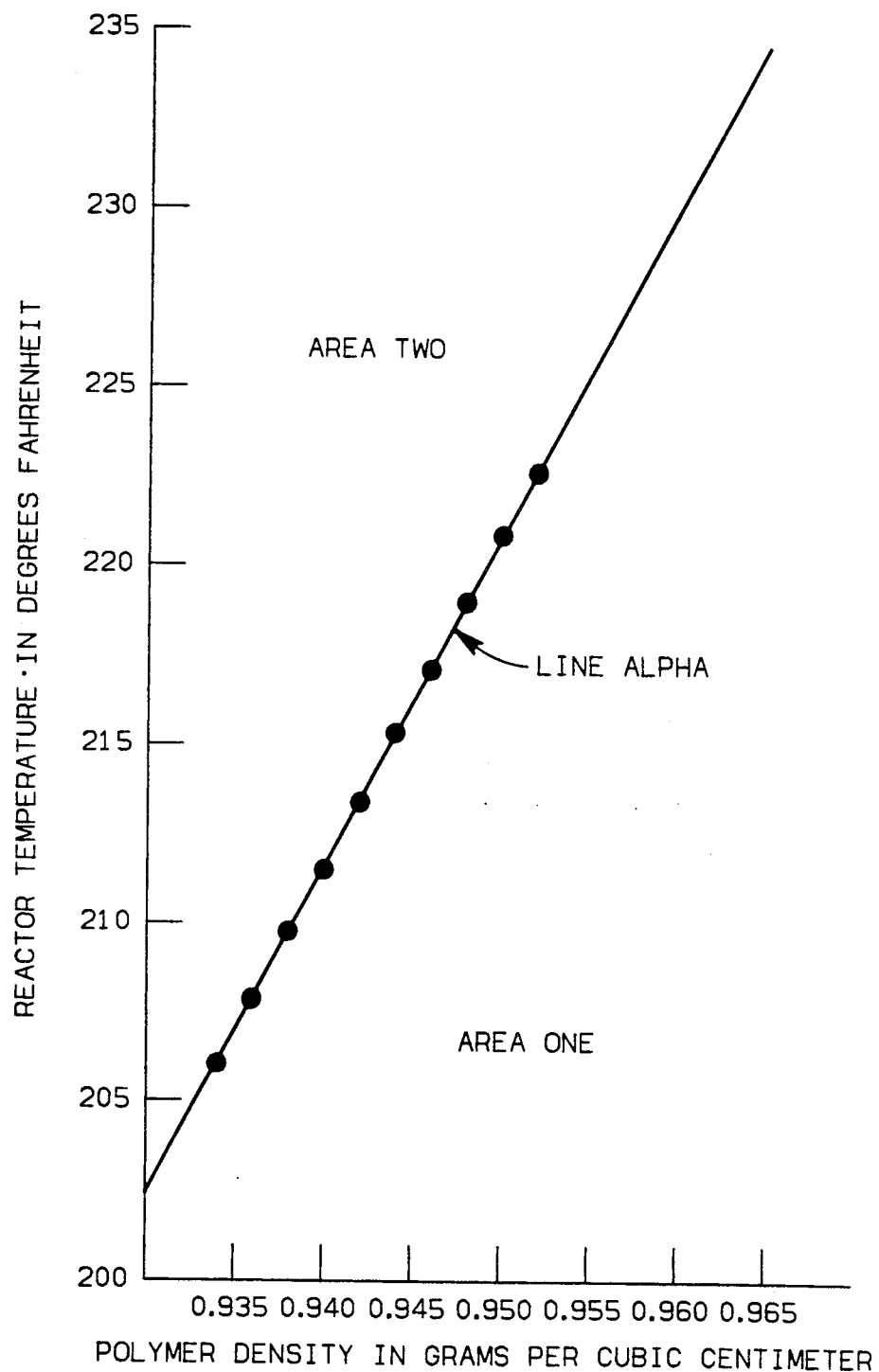

HIGH-TEMPERATURE SLURRY POLYMERIZATION OF ETHYLENE

BACKGROUND OF THE INVENTION

This invention relates to a slurry polymerization of ethylene.

Chromium catalysts have long been known in the art. Supported chromium catalysts have been a dominate factor in the commercial production of polyethylene. Originally, commercial processes used solution polymerization techniques to produce polyolefins. However, it later became evident that a slurry polymerization process was a more economical route to produce commerical grades and quantities of polymer.

Slurry polymerization is unlike solution polymerization, in that, the polymer, as it is formed during the slurry process, is largely insoluble in the inert carrying diluent. This makes it easier to recover the polymer. However, certain control techniques which are easily carried out in a solution polymerization become nearly impossible in a slurry polymerization. For example, in solution polymerization to make a polymer that has a lower molecular weight, as well as higher melt flow index, the temperature can be raised, thus accomplishing this desired result. However, in a slurry polymerization there is a practical limit on increasing temperature because the point is quickly reached where the polymer goes into solution and fouls the reactor.

In general, reactor fouling occurs when polymer particles, in a slurry polymerization process, dissolve into the reactor's liquid phase. Specifically, the polymer particles, while dissolving, increase the volume that they occupy by several orders of magnitude. This increase in volume causes the viscosity to increase in the liquid phase of the reactor. If the polymer particles continue to dissolve, thereby increasing the viscosity, eventually a gel-like substance is formed which plugs the reactor. Unplugging a fouled reactor is a time-intensive and costly undertaking.

Over the years, those in the art have come up with various relationships to help reactor operators avoid a reactor fouling incident. One of the oldest relationships, in this art, is the density v.s. temperature foul curve. (See the FIGURE). For many years, this relationship has been considered to be practically inviolable. This is in spite of the fact that it would be highly desirable to operate a slurry polymerization process at a reactor temperature higher than the foul curve temperature for a specific copolymer density.

SUMMARY OF THE INVENTION

It is an object of this invention to provide an improved slurry polymerization process.

It is another object of this invention to provide a process to make a higher melt index polymer from a slurry polymerization process.

It is still another object of this invention to provide a slurry polymerization process which as a byproduct produces hexene.

It is yet a further object of this invention to provide a higher heat exchange efficiency for a polymerization reactor cooling system.

It is a further object of this invention to produce conditions suitable to more efficient ethylene-hexene copolymerization.

In accordance with this invention, in a continuous loop reactor which has isobutane as a diluent, ethylene is contacted with a catalyst system made by (a) subjecting a supported chromium catalyst to oxidizing conditions and thereafter to carbon monoxide under reducing conditions and (b) combining the catalyst of (a) with a cocatalyst selected from trialkyl boron compounds and polyalkyl silane compounds, at a reactor temperature above the foul curve temperature for a copolymer of the density produced.

BRIEF DESCRIPTION OF THE FIGURE

The FIGURE is a depiction of the relationship between the density of a polymer and the temperature of the reactor system. This FIGURE is specifically related to this relationship in the context of a slurry polymerization of ethylene catalyzed by a chromium catalyst system, in which hexene is generated in situ as a comonomer, and is depicted by line alpha which is the foul curve.

DETAILED DESCRIPTION OF THE INVENTION

Within this description the terms "cogel" and "cogel hydrogel" are arbitrarily used to describe co-gelled silica and titania. The term "tergel" is used to describe the product resulting from gelation together of silica, titania, and chromium. Hydrogel is defined as a support component containing water. "Xerogel" is a support component which has been dried and is substantially water-free.

THE CATALYST SYSTEM

One component of the catalyst system is the catalyst support. It is preferred that one or more refractory oxides comprise the catalyst support. Examples of refractory oxides include, but are not limited to, alumina, boria, magnesia, silica, thoria, zirconia, or mixtures of two or more of these compounds. Preferably the support is a predominantly silica support. By predominantly silica is meant either an essentially pure silica support or a support comprising at least 90 weight percent silica, the remaining being primarily refractory oxides such as alumina, zirconia, or titania. Most preferably the support contains 92 to 97 weight percent silica and 3 to 8 weight percent titania. The catalyst support can be prepared in accordance with any method known in the art. For example, support preparations given in U.S. Pat. Nos. 3,887,494; 3,900,457; 4,053,436; 4,151,122; 4,294,724; 4,392,990; 4,405,501; which are hereby incorporated by reference; can be used to form the catalyst support.

Another component of the catalyst system must be a chromium compound. The chromium component can be combined with the support component in any manner known in the art, such as forming a tergel. Alternatively, an aqueous solution of a water soluble chromium component can be added to a hydrogel support. Suitable chromium compounds include, but are not limited to, chromium acetate, chromium nitrate, chromium trioxide, or mixtures of two or more of these types of compounds. Additionally, a solution of a hydrocarbon soluble chromium compound can be used to impregnate a xerogel support. Suitable hydrocarbon soluble chromium compounds include, but are not limited to, tertiary butyl chromate, biscyclopentadienyl chromium II, chromium acetyl acetonate, or mixtures of two or more of these types of compounds.

The chromium component is used in an amount sufficient to give about 0.05 to about 5, preferably about 0.5 to about 2 weight percent chromium based on the total weight of the chromium and support after activation. After the chromium component is placed on the support it is then subjected to activation in an oxygen containing ambient in the manner conventionally used in the art. Because of economic reasons, the preferred oxygen-containing ambient is air, preferably dry air. The activation is carried out at an elevated temperature for about 30 minutes to about 50 hours, preferably 2 to 10 hours at a temperature within the range of 400° C. to 900° C. Under these conditions at least a substantial portion of any chromium in a lower valent state is converted to the hexavalent form by this procedure.

The resulting supported catalyst component is cooled and then subjected to at least partial reduction of the hexavalent chromium to a lower valent state prior to combining with a cocatalyst. The reducing agent must be carbon monoxide. The carbon monoxide can be employed at temperatures between 300° and 500° C. The partial pressure of the reducing gas in the reduction operation can be varied from subatmospheric pressures to relatively high pressures, but the simplest reducing operation is to utilize essentially pure carbon monoxide at atmospheric pressure. Alternatively, a mixture of 10% by volume of carbon monoxide, in an inert ambient, such as nitrogen or argon, can also be used.

The reduction time can vary from a few minutes to several hours or more. The extent of reduction can be followed by visual inspection of the catalyst color. The color of the initial oxygen activated catalyst is generally orange, indicating the presence of hexavalent chromium. The color of the reduced catalyst employed in the invention is blue, indicating that all or substantially all of the initial hexavalent chromium has been reduced to a lower oxidation state. After reduction, the reduced, supported catalyst component is generally cooled, in an inert atmosphere, such as argon or nitrogen, to flush out the reducing agent. After the flushing treatment, the catalyst is kept away from contact with either a reducing agent or an oxidizing agent. Examples of these types of catalyst components can be found in the art. For example, exemplary examples can be found in U.S. Pat. No. 4,820,785; hereby incorporated by reference.

The cocatalysts can be either a trialkyl boron compound or a polyalkyl silane compound. However, this is not meant to exclude joint use of these compounds in the same copolymerization reaction.

If the cocatalyst chosen is a trialkyl boron compound the alkyl groups should have between 1 and 10 carbon atoms and preferably between 2 and 4 carbon atoms. Presently the most preferred compound is triethylborane. The trialkyl boron is used in an amount within the range of 0.5 to 10 weight percent based on the weight of the chromium and support, with about 1 to 8 weight percent being preferred.

When using the trialkyl boron cocatalyst, the order of addition of the components can be important. It is preferred that the cocatalyst and the reduced supported catalyst be precontacted prior to its introduction to the ethylene monomer. In a slurry operation this can be carried out by pretreating the reduced supported catalyst with the cocatalyst and then adding the resulting composition to the reactor. In this manner the reduced supported catalyst and the cocatalyst can be introduced continuously in the polymerization reaction. Examples of trialkyl boron used in conjunction with supported chromium catalysts can be found in U.S. Pat. No. 4,820,785 which is hereby incorporated by reference.

If the cocatalyst chosen is a polyalkyl silane compound it should be of the formula $R_{4-m}SiH_m$, where m is an integer from 1 to 4. R is independently selected from any aliphatic and/or aromatic radical with one or more carbon atoms. Examples of silane type compounds to use in this invention include, but are not limited to, ethylsilane, diethylsilane, triethylsilane, phenylsilane, n-hexylsilane, diphenylsilane, triphenylsilane, and polymethylhydrosilane. Preferred silane compounds include, but are not limited to, diethylsilane, phenylsilane, n-hexylsilane, and mixtures of two or more of these type compounds. The amount of silane to be used is about 0.1 to about 16 weight percent and preferably about 0.3 to about 8 weight percent based on the weight of the reduced supported catalyst. Most preferably about 0.5 to about 4 weight percent is used.

The silane compound can be contacted with the reduced supported catalyst prior to the its use or it can be added to the reactor during the copolymerization. However, for maximum benefit, the reduced supported catalyst preferably is exposed to the silane compound prior to contacting the ethylene monomer. Therefore, the silane and reduced supported catalyst more preferably are precontacted prior to introduction into the polymerization reactor.

When the silane is added directly to the polymerization reactor, the silane usually is added in a hydrocarbon solution, with the hydrocarbon usually being the same as the solvent contained in the reactor, but is not restricted to that solvent. Dilute solutions, i.e., about 0.005 to about 1 weight percent, are conveniently used when passing the silane solution into the reactor. If the silane and the reduced supported catalyst are precontacted prior to introduction to the polymerization reactor, a more concentrated silane solution can be used. After precontacting the reduced supported catalyst and silane, it is desirable to thoroughly mix the silane solution and the reduced supported catalyst.

REACTION CONDITIONS

The polymerization is carried out under high-temperature slurry conditions. Such polymerization techniques are well known in the art and are disclosed, for example, in U.S. Pat. No. 3,248,179 which is hereby incorporated by reference. It is essential for this invention that a continuous loop reactor is used. Furthermore, the diluent utilized in this invention must be isobutane.

The effect of using this catalyst is to generate 1-hexene in situ thus giving an ethylene/hexene copolymer from a pure ethylene feed.

In the figure, the following designations are defined as:

Area One: is a depiction of the prior art area where safe non-fouling operating temperatures are found for a given polymer density.

Area Two: is a depiction of the invention area where safe non-fouling operating temperatures are found for a given polymer density when using the catalyst system in this specification.

Line Alpha: is a depiction of the foul curve; this is the boundary between the prior art area of safe operating temperatures and the new available operating temperatures of this invention; this line is defined by the following equation:

$$T = 917.3D - 650.6$$

where
(1) $0.930 \leq D \leq 0.960$;
(2) T is the temperature in degrees fahrenheit; and
(3) D is the density in grams per cubic centimeter.

The preferred reactor temperature to use in this slurry process is described by the following boundries:
(1) $(F.L.T.) < (O.T.)$; more preferably
(2) $(F.L.T.) < (O.T.) \leq (F.L.T.) + 20°$ F.; and most preferably
(3) $(F.L.T.) + 5°$ F. $\leq (O.T.) \leq (F.L.T.) + 15°$ F.;

where (F.L.T.) is the foul line temperature for a certain polymer density; and (O.T.) is the operating temperature of the reactor. The differences in the preferred ranges are a compromise between the competing factors of increased energy cost in performing this process and the higher melt index polymers obtainable by this process.

Using this catalyst system at these temperatures the amount of hexene generated in situ can be varied so as to adjust the density of the desired polymer by increasing or decreasing the amount of cocatalyst used. For example, increasing the amount of cocatalyst will increase the amount of hexene generated. The density can also be controlled by removing unwanted hexene from the reactor's diluent thereby increasing the density. This removed hexene can be separated from the diluent by any reasonable means known in the art. Additionally, the density of the polymer can be controlled by affirmatively adding hexene to the reactor.

EXAMPLE

A 600 gallon reactor was used to conduct this slurry polymerization of ethylene and 1-hexene. The reactor was similar to those disclosed in U.S. Pat. No. 3,248,179. The reactor was being run continuously at a production level of about 1000 lbs/hr polymer. The liquid phase in the reactor was primarily the iso-butane carrying diluent. The catalyst was chromium supported on a silica-titania support made in accordance with U.S. Pat. No. 4,820,785. The cocatalyst selected was triethylborane. The monomer feed was essentially ethylene with the hexene being generated in situ for incorporation into the copolymer. Although this was essentially an ethylene-hexene copolymerization, some other comonomers could also have been generated in situ and subsequently copolymerized with the ethylene monomer. The polymerization was allowed to proceed for several days before the testing described in Table 1 occurred. The following data were collected.

TABLE 1

| Elapsed Time in Minutes[4] | Reactor Temperature in Degrees Fahrenheit | Density in Grams Per Cubic Centimeter[5] |
|---|---|---|
| 0 | 211.5 | 0.9460 |
| 15 | 212.0 | |
| 30 | 212.5 | |
| 45 | 213.0 | 0.9449 |
| 60 | 213.5 | |
| 75 | 214.0 | |
| 105 | 214.5 | 0.9444 |
| 135 | 215.0 | |
| 165 | 215.5 | 0.9438[1] |
| 195 | 216.0 | |
| 210 | 216.5 | |
| 225 | 217.0 | 0.9423[2] |
| 255 | 217.5 | |
| 270 | 218.0 | |
| 285 | 218.5 | 0.9419[3] |
| 315 | 219.0 | |
| 345 | 219.0 | |

[1] No reactor fouling yet.
[2] Still no reactor fouling.
[3] Some signs of reactor stress but still no fouling.
[4] As noted above, this polymerization was continued for several days before this experiment was conducted.
[5] These densities are the densities of the polymer at the end of the production line. These polymers exited the reactor about 1-3 hours earlier. They represent an average density made over the preceeding hour.

Comparing the density v.s. temperature relationship in the figure with the data in the table it is apparent that the reactor was running above the foul curve for the reaction. It should be noted that the densities recorded are the densities of the polymer at the end of the production line. Taking into account the nearly linear decrease in the polymer density it is apparent that the polymer actually made at T=345 would be much lower in density than the last 0.9418 density measurement. All in all, the reactor was running at a temperature of at least 5-10 degrees above the foul curve for about 3 hours. This is a significant increase in the allowed operating area, thus giving additional advantages such as improved melt indexes.

While this invention has been described in detail for purpose of illustration, it is not to be construed as limited thereby, but is intended to cover all changes and modifications within the spirit and scope thereof.

That which is claimed is:

1. A polymerization process comprising: contacting, in a continuous loop reactor which has isobutane as a diluent, an ethylene feedstream with a catalyst system, which generates in situ hexene as a comonomer, made by a process comprising:
   (a) subjecting a chromium catalyst component which is supported on a refractory oxide support to activation in an oxygen containing ambient at an elevated temperature sufficient to convert at least a portion of any chromium in a lower valent state to a hexavalent state;
   (b) thereafter subjecting the thus activated composition of (a) to carbon monoxide under reducing conditions; and
   (c) thereafter contacting the thus reduced composition of (b) with a cocatalyst select from trialkyl boron compounds and polyalkyl silane compounds;
   under slurry polymerization conditions that include a polymerization temperature above the foul curve temperature to produce a copolymer with a density between 0.930 grams per cubic centimeter and 0.960 grams per cubic centimeter.

2. A process according to claim 1 wherein said ethylene feedstream consists essentially of pure polymerization grade ethylene.

3. A process according to claim 1 wherein said chromium catalyst component is about 0.05 to about 5 weight percent chromium based on the total weight of said chromium and support after activation.

4. A process according to claim 1 wherein said support is selected from the group consisting of alumina, boria, magnesia, silica, thoria, zirconia, and mixtures thereof.

5. A process according to claim 1 wherein said support is predominantly silica.

6. A process according to claim 5 wherein said predominantly silica support is about 92 to 97 weight percent silica the remainder being a titania component.

7. A process according to claim 5 wherein said predominantly silica support is a cogel of at least 90 weight percent silica the remainder being a titania component.

8. A process according to claim 5 wherein said predominantly silica support is essentially pure silica.

9. A process according to claim 1 wherein said activation is carried out in the air at a temperature within the range of 400° to 900° C.

10. A process according to claim 1 wherein said reducing conditions include a temperature within the range of 300° to 500° C.

11. A process according to claim 1 wherein said cocatalyst is triethylborane.

12. A process according to claim 1 wherein said silane cocatalyst is selected from the group consisting of ethylsilane, diethylsilane, triethylsilane, phenylsilane, diphenylsilane, triphenylsilane, n-hexylsilane, polymethylhydrosilane, and mixtures thereof.

13. A process according to claim 1 wherein said polymerization temperature is between 0° and 20° F. above said foul curve temperature.

14. A process according to claim 1 where a portion of in situ hexene is removed from the process.

15. A polymerization process comprising: contacting, in a continuous loop reactor which has isobutane as a diluent, an ethylene feedstream with a catalyst system, which generates in situ hexene as a comonomer, made by a process comprising:
  (a) subjecting a chromium catalyst component which is supported on a silica/titania support to activation in air at a temperature between 400° to 900° C.
  (b) thereafter subjecting the thus activated composition of (a) to carbon monoxide under reducing conditions; and
  (c) thereafter contacting the reduced composition of (b) with triethylborane;
  under slurry polymerization conditions that include a polymerization temperature about 5° to about 15° F. above the foul curve temperature to produce a copolymer with a density between 0.930 grams per cubic centimeter and 0.960 grams per cubic centimeter.

* * * * *